United States Patent [19]

Nakagawa

[11] 4,362,688

[45] Dec. 7, 1982

[54] METHOD FOR MOLDING A PLASTIC PIPE

[75] Inventor: Tatsuya Nakagawa, Matsudo, Japan

[73] Assignee: Excell Corporation, Tokyo, Japan

[21] Appl. No.: 187,369

[22] Filed: Sep. 15, 1980

Related U.S. Application Data

[63] Continuation-in-part of Ser. No. 53,210, Jun. 29, 1979, Pat. No. 4,239,474.

[51] Int. Cl.³ .............................................. B29C 17/07
[52] U.S. Cl. .................................. 264/503; 264/540; 264/542; 425/525; 425/532
[58] Field of Search ............... 264/503, 506, 523, 531, 264/540-543; 425/525, 532, 326.1

[56] References Cited

U.S. PATENT DOCUMENTS

| | | | |
|---|---|---|---|
| 1,634,160 | 6/1927 | Semple | 425/325 X |
| 2,128,239 | 8/1938 | Ferngren | 264/540 |
| 3,425,092 | 2/1969 | Taga | 264/543 X |
| 3,733,309 | 5/1973 | Wyeth et al. | 264/DIG. 33 X |
| 3,809,521 | 5/1974 | La Fosse | 425/532 X |

FOREIGN PATENT DOCUMENTS 55-21240 2/1980 Japan .................................. 264/540

*Primary Examiner*—Jan H. Silbaugh
*Attorney, Agent, or Firm*—Fidelman, Wolffe & Waldron

[57] ABSTRACT

A lower mold half is horizontally placed. The top surface of the lower mold half is provided with a first groove of any desired shape, one end of which is closed with the other end having a notch for allowing air to be blown in. An upper mold half has a bottom surface which matches the top surface of the lower mold half and which is provided with a second groove corresponding in shape to said first groove. Thus, when the upper and lower mold halves are brought into contact, there is formed a mold cavity defined by the first and second grooves. A discharging unit including a nozzle for discharging a parison is disposed above the lower mold half and the nozzle is so provided that it can rotate in either direction at a variable speed. At least one of the nozzle and the lower mold half is movably provided to lay a parison in the first groove.

5 Claims, 16 Drawing Figures

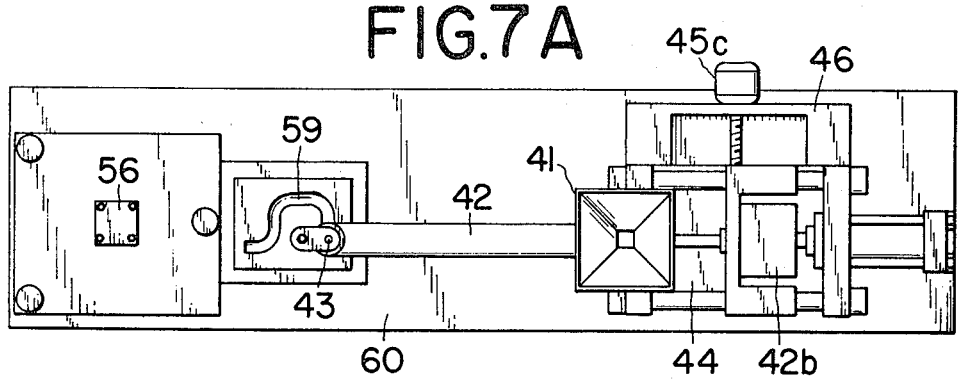
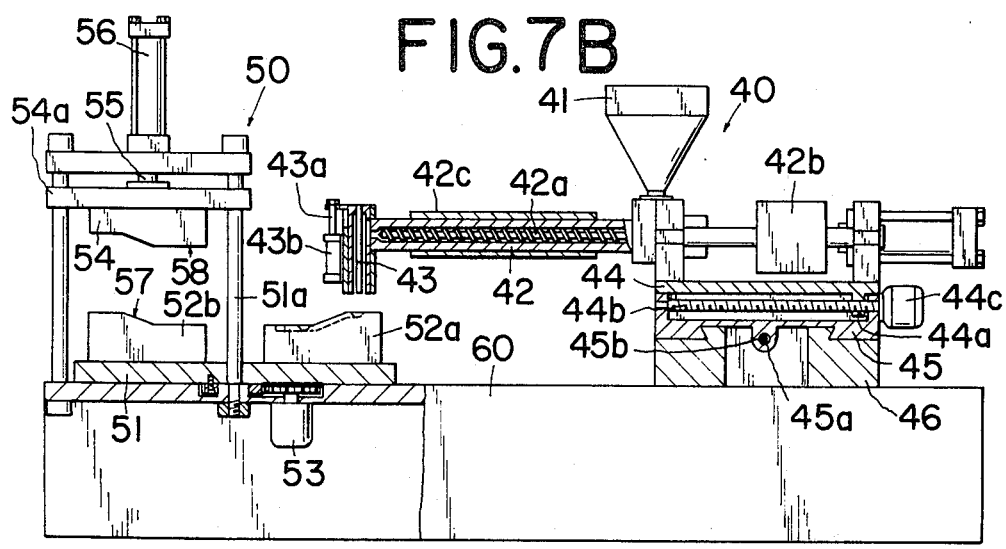
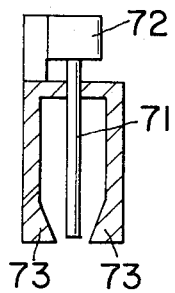
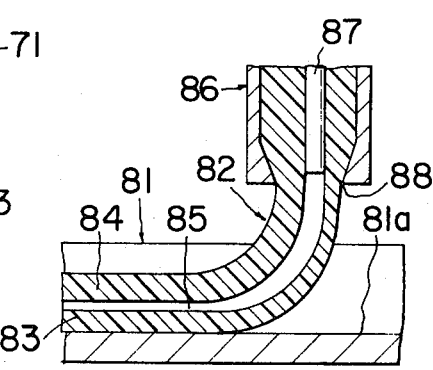
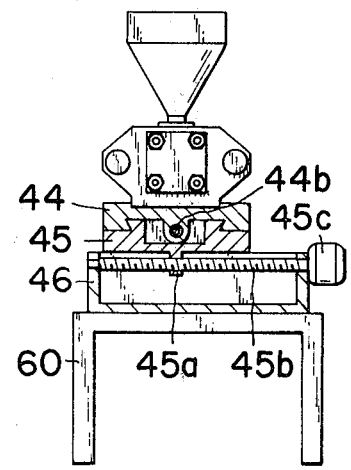

METHOD FOR MOLDING A PLASTIC PIPE

CROSS-REFERENCE TO RELATED APPLICATION

This application is a continuation-in-part of copending application Ser. No. 053,210, filed on June 29, 1979 now U.S. Pat. No. 4,239,474, issued Dec. 16, 1980.

BACKGROUND OF THE INVENTION

The present invention relates to a method and apparatus for molding a plastic pipe, which is particularly suitable for forming a plastic pipe of complicated configuration.

Since a pipe used as an air duct for a ventilation device or cooling device must generally be disposed at a position subject to different constraints, a rubber pipe rich in deformability, or flexibility, has been conventionally used. If the material of a pipe has poor flexibility, various kinds of pipe joints must be prepared to complete a piping system.

Although a rubber pipe can be used with excellent performance and easy handling, its exorbitant production cost and difficulty in forming a pipe in complicated configuration inhibit wide spread application. Under the circumstances, attention has recently shifted to the use of a less expensive thermal plastic resin such as polyethylene, polypropylene and the like as an alternative material. When use is made of a thermal plastic resin, however, there are still disadvantages mainly caused by the difficulty in forming a plastic pipe of complicated configuration in accordance with the conventional technology. For example, a number of plastic pipes of different sizes and shapes together with various kinds of joints such as elbows must be prepared. It is quite time consuming to assemble these pipes and joints to set up a desired piping system. Furthermore, it is often the case to leave small interstices at a joint, which allow the passage of fluid.

Explaining the conventional technique to form an elbow pipe with reference to FIGS. 1 to 3, a parison 13 in the form of a hollow tube is continuously extruded out of a nozzle 14 vertically downward, i.e. in the direction of gravity, into the position where vertical mold halves 12a and 12b, each having an engraved groove 11a or 11b on its surface, are oppositely placed. Each of the grooves 11a or 11b has a semi-circular cross section so that when the mold halves 12a and 12b are brought into contact, a mold cavity in the form of an elbow pipe is defined therebetween. Then the mold halves 12a and 12b are brought into contact under pressure, followed by blowing air into the parison. Upon cooling, an elbow pipe is formed in compliance with the shape of the grooves engraved in the mold halves.

In accordance with this conventional technique, however, since the parison 13 is hanging down from the nozzle 14 under gravity between the vertically arranged mold halves, there is a limit in length and it is virtually impossible to control its thickness. If the parison 13 gets too long, it will change its shape or simply tear off. Moreover, if a pipe to be formed is complicated in structure, it will necessarily produce a flash by overflowing the mold cavity because excessive material must be supplied. This requires a secondary processing of flash removal which, in turn, increases production cost. For example, even in the case of molding an elbow pipe as explained above, somewhat excessive material must be supplied to fill the cavity completely. When the mold halves 12a and 12b are pressed against each other, the excessive material overflows into the gap between the mold halves 12a and 12b to produce a flash 16. The production of such a flash is just waste of material as well as requiring a secondary processing of flash removal, which can be quite laborious if the pipe is complicated in configuration. Therefore, in accordance with such a conventional plastic pipe molding technique, it is impossible to form a pipe of complicated configuration, e.g. a pipe provided with bellows in the middle to give flexibility in bending, a pipe with a sudden area change, or a pipe with its shape changing three dimensionally.

OBJECTS OF THE INVENTION

An object of the present invention is to provide a method and apparatus for molding a plastic pipe which is capable of molding a pipe of complicated configuration without producing a flash.

Another object of the present invention is to provide a method and apparatus for molding a plastic pipe which is capable of forming a long pipe with any desired thickness.

A further object of the present invention is to provide a method and apparatus for molding a plastic pipe which comprises a lower mold half, an upper mold half which can be placed on the lower mold half to define a mold cavity, and a parison extruder, whereby the relative positional relationship between the lower mold half and the parison extruder is varied under control to lay a parison properly in the groove engraved on the surface of the lower mold half.

A still further object of the present invention is to provide a method and apparatus for molding a plastic pipe which comprises two or more lower mold halves mounted on a rotatable support so that pipe molding can be continuously operated.

A still further object of the present invention is to provide a method and apparatus for molding a plastic pipe which enables proper positioning of a parison along a crooked groove at all times.

A still further object of the present invention is to provide a method and apparatus for molding a plastic pipe which ensures complete control over the wall thickness of a parison even if a groove, into which the parison is to be provided, is extremely crooked.

A still further object of the present invention is to provide a method and apparatus for molding a plastic pipe which is characterized by rotating a parison-extruding nozzle with its own vertical axis along a curved portion of a groove in an intended direction and rate of rotation for ensuring proper positioning and wall thickness control of a parison.

A still further object of the present invention is to provide a method and apparatus for molding a pipe which is efficient in operation and simple in structure.

Other objects, advantages and novel features of the present invention will become apparent from the following detailed description of the invention when considered in conjunction with the accompanying drawings.

BRIEF DESCRIPTION OF THE DRAWINGS

FIGS. 7A, 7B and 7C are a plan view, a front elevational view and a side elevational view, respectively, showing another embodiment of the present invention;

FIG. 8 is a schematic illustration showing an example of a parison control device;

FIG. 9 is a schematic illustration showing an example of the means of discharging a parison in a manner that the thickness of the parison is unequal;

DETAILED DESCRIPTION OF THE INVENTION

Figure 1:
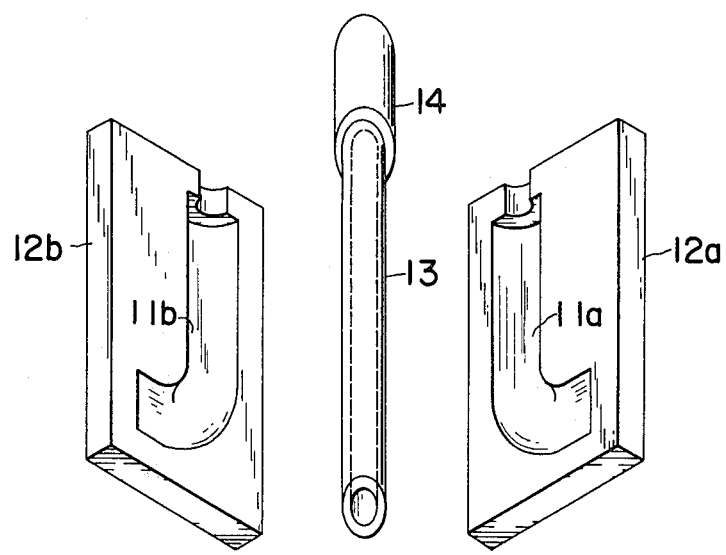
FIG. 1 is a perspective view showing a conventional device.
Figures 2, 3:
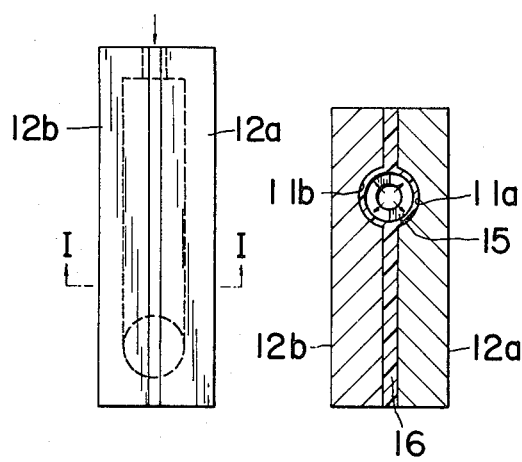
FIG. 2 is a side elevational view of the device shown in FIG. 1, but with the two mold halves in contact.
FIG. 3 is a sectional view taken along the line I—I of FIG. 2.
Figure 4:
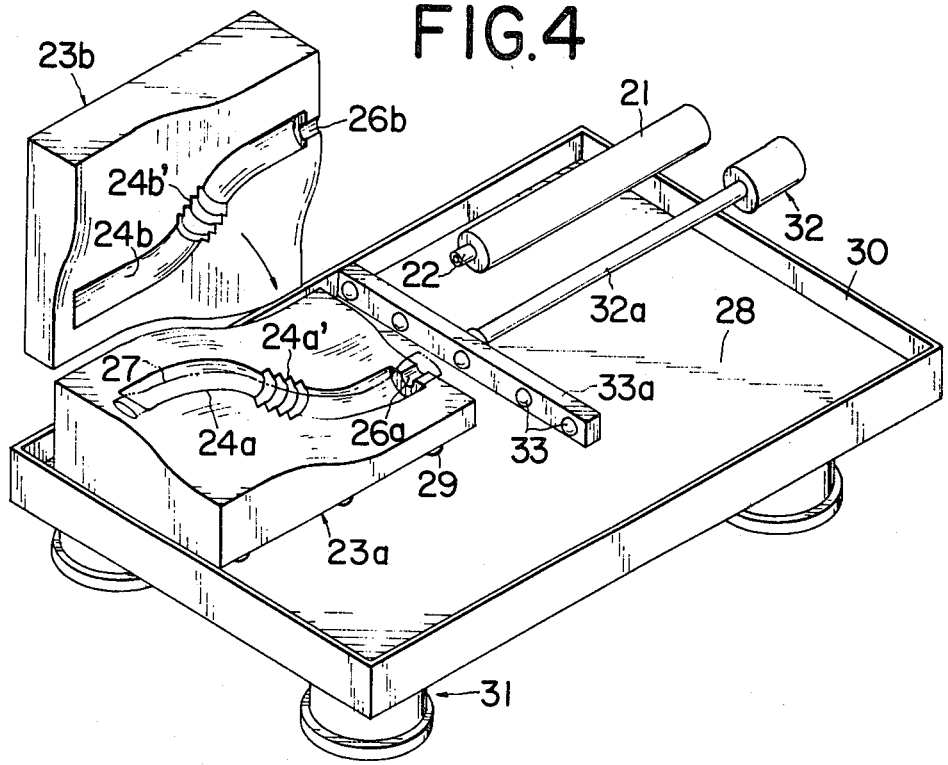
FIG. 4 is a perspective view showing one embodiment of the present invention.
Figure 5A:
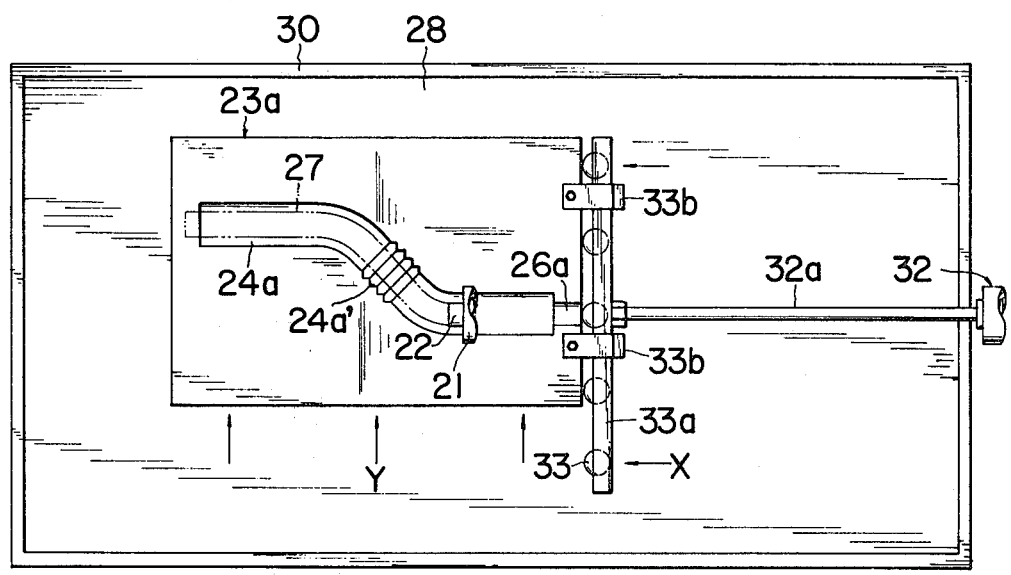
FIGS. 5A and 5B are a plan view and a sectional view cut along the groove, respectively.
Figure 5B:
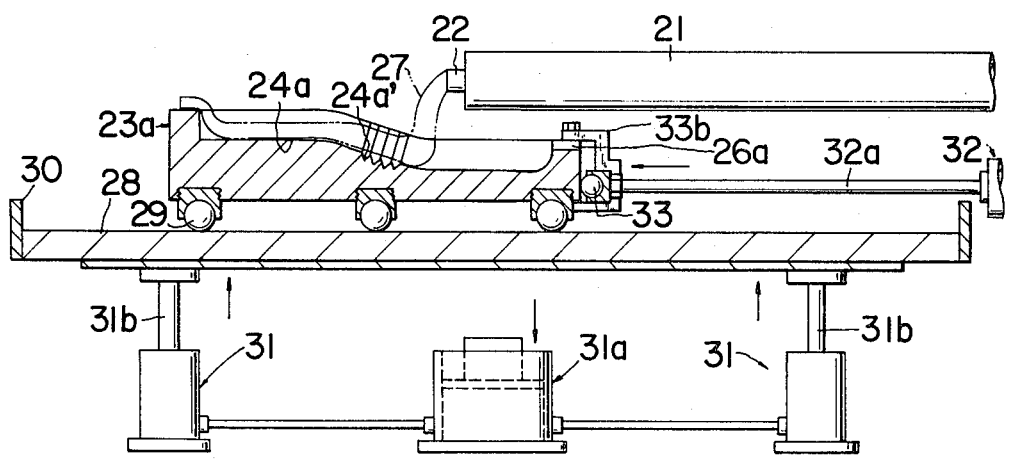

In FIGS. 4 and 5, a numeral 21 designates a tube containing a material for forming a parison 27, which is usually a thermal plastic material such as polyethylene, polypropylene, etc. A numeral 22 designates a nozzle for discharging a parison 27 in the form of a tube. The tube 21 and the nozzle 22 are parts of a parison extruder. In this embodiment, the tube 21 and the nozzle 22 are fixedly provided and a mold 23 is moved with respect thereto. The mold 23 comprises a lower mold half 23a and an upper mold half 23b, each of which is provided with a groove 24a or 24b of semi-circular cross section engraved on its joining surface. As shown in the drawings, the joining surfaces of the mold 23 have a three dimensional variation in accordance with the curve required for forming a plastic pipe of desired shape. The forward end of the groove 24a or 24b is closed so that the mold cavity defined by the grooves can be sealed when the lower and upper mold halves 23a and 23b are put together; whereas, the rearward end of the groove 24a or 24b is provided with a notch 26a or 26b for blowing air into the parison. Numerals 24a' and 24b' indicate sections of the grooves 24a and 24b, respectively, where bellows are formed.

A numeral 28 designates a horizontal support on which the lower mold half 23a is placed in such a manner that it can move freely. The lower mold half 23a is provided with a plurality of bearings 29, composed of steel balls or the like, which are rotatably held on the bottom surface thereof. A numeral 30 designates a frame fixed to the outer periphery of the support 28 for limiting the unexpected horizontal overrun of the lower mold half 23a. The mold 23 is operatively associated with a horizontal driving means and a vertical driving means.

One example of the horizontal and vertical driving means will be explained with reference to FIGS. 4 and 5. The support 28 is placed on a plurality of rods 31b which are individually housed in cylinders 31. The cylinders 31 are hydrodynamically connected to a pressure regulator 31a, which, in turn, is connected to a pressure source (not shown). While, another cylinder 32 and a rod 32a are disposed horizontally and a horizontal bar 33a with balls 33 partially embedded therein is attached at the forward end of the rod 32a. The horizontal bar 33a is slidably supported by a pair of brackets 33b. As best shown in FIG. 5A, only one cylinder actuator for moving the mold 23 in the X-direction is shown in the drawings; however, it is to be noted that there should be provided another cylinder actuator which moves the mold 23 in the Y-direction, but this is omitted in the drawings for simplicity.

The cylinder actuators for moving the mold in the X and Y directions are hydrodynamically connected to respective pressure regulators (not shown), which, in turn, are connected to a pressure source (not shown). All of these three pressure regulators are operatively connected to a control device (not shown) such as a numerical control device so that the mold 23 can be moved automatically with the center line of the groove 24a always positioned immediately below and at the same distance from the nozzle 22.

The process of molding a plastic pipe with the use of the present apparatus will now be explained. First, as shown in FIGS. 4 and 5, the groove 24a of the lower mold half 23a is positioned below the nozzle 22. Then, with the parison 27 continuously discharged out of the nozzle 22, the lower mold half 23a is moved horizontally as well as vertically in accordance with instructions from the control device so that the parison 27 can be laid properly within the groove 24a. On the other hand, the horizontal and vertical movement of the lower mold half 23a may be operated manually, or any other mechanical or electrical means.

With the parison 27 properly positioned in the groove 24a, the upper mold half 23b is placed on the lower mold half 23a, and then air at a predetermined pressure is injected through a port 26 defined by the notches 26a and 26b into the parison 27. Since the forward end of the parison 27 is sealed like a bag when the upper and lower mold halves are put together, the parison 27 becomes inflated within the mold cavity and formed into a certain shape defined by the surfaces of the grooves. Upon cooling, the upper mold half 23b is removed to take out a molded pipe. In the case where the above-mentioned operation is to be continuously executed, two or more supports 28, each having a lower mold half 23a thereon, may be disposed on a rotatable disc.

Figures 6A, 6B:
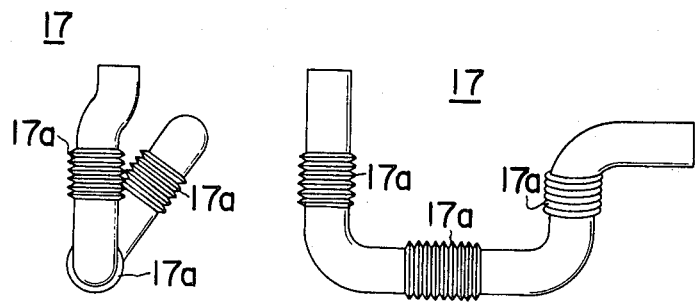
FIGS. 6A and 6B are a side elevational view and a front elevational view, respectively, of the plastic pipe formed according to the present invention.

FIGS. 6A and 6B show one example of the plastic pipe molded by the apparatus in accordance with the present invention. A thin pipe 17 has rising parts at the front and rear ends. As shown in FIG. 6A, the pipe is twisted to present a V-shape, and as shown in FIG. 6B, the right-hand rising part is bent outward at 90 degrees. Bellows 17a, 17b and 17c are provided to give flexibility in bending.

Another embodiment of the present invention is shown in FIGS. 7A, 7B and 7C. As different from the abovedescribed embodiment, a nozzle from which a parison is discharged is moved while temporarily keeping a lower mold half stationary. The present apparatus comprises a base 60 on which a parison supply section 40 and a mold processing section 50 are provided.

The parison supply section 40 includes a hopper 41 in which a source material for parison is contained. A tube 42 extends horizontally from the bottom of the hopper 41 and a auger screw 42a is housed therein. A heater 42c is wrapped around the tube 42. The auger screw 42a is driven to rotate by a motor 42b to send the source material along the tube 42 to a nozzle 43 which is mounted at the end of the tube 42. The nozzle 43 is fixed to a rod 43a housed in a cylinder 43b which is fixedly mounted on the tube 42. Therefore, the nozzle 43 can be moved vertically with respect to the tube 42.

The tube 42 is fixedly mounted on a top plate 44 which is movable in the longitudinal direction of the tube 42. A projection 44a extends downward from the top plate 44 and is in mesh with a threaded rod 44b which is driven to rotate by a motor 44c and rotatably supported by an intermediate plate 45. Thus, the rotation of the rod 44b causes to move the top plate 44 slidingly with respect to the intermediate plate 45 in the longitudinal direction of the tube 42.

While, the intermediate plate 45 also has a downwardly extending projection 45a which is in mesh with a threaded rod 45b drivingly connected to a motor 45c. The rod 45b is rotatably supported by a frame 46 which is fixedly provided on the base 60. Therefore, the rotation of the rod 45b causes the intermediate plate 45 to move in the direction perpendicular to the longitudinal direction of the tube 42. As a result, the top plate 44, and therefore the nozzle 43 can be moved in any desired horizontal direction by driving the motors 44c and 45c appropriately. Furthermore, since the nozzle 43 can be moved vertically by means of the rod 43a and cylinder 43b combination, the nozzle 43 can be moved in any desired direction in three-dimension.

The mold processing section 50 includes a rotatable support 51 on which two lower mold halves 52a and 52b are fixedly provided. By means of a motor 53, the support 51 can be rotated around a shaft 51a. An upper mold half 54 is fixedly provided on an upper plate 54a which is attached at the end of a vertical rod 55. The vertical rod 55 is housed in a cylinder 56 and, in accordance with the pressure supplied to the cylinder 56, the rod 55 moves in and out of the cylinder 56 to determine the position of the upper mold half 54.

The top surface 57 of the lower mold half 52a or 52b has an arbitrary curve depending on the shape of a pipe to be molded. The upper mold half 54 has a bottom surface 58 which matches with the top surface 57 of the bottom mold half 52a or 52b. On the curved surface 57 or 58 is engraved a groove 59 so that, when the upper and lower mold halves are brought into contact, there is formed a mold cavity defining the shape of a pipe to be molded.

The motors 44c and 45c and the cylinder 43b are all operatively connected to a control unit (not shown) such as a numerical control device, in which the shape of a pipe to be molded can be programmed beforehand. Therefore, the motors 44c and 45c are driven and the cylinder 43b is actuated in accordance with the instructions fed from the control unit so that the nozzle 43 moves to follow the groove 59 with maintaining a predetermined distance therefrom to lay a parison properly within the groove 59.

Meanwhile, the motor 53 and the cylinder 56 are also operatively connected to the control unit. Thus, when a parison is laid within the groove 59, the motor 53 is driven to rotate the support 51 by 180 degrees in accordance with the instruction from the central control unit. Then, the upper mold half 54 is brought downward into contact with the lower mold half 52b, in the groove of which is positioned a parison, to initiate blow molding process. At the same time, the nozzle 43 starts to supply a parison onto the other lower mold half 52a. In this manner, the pipe molding operation can be carried out continuously.

In order to control the thickness of a parison, a parison control device can be provided at the exit of a parison discharging nozzle. One example of the parison control is shown in FIG. 8, where an inner rod 71 is connected to a cylinder actuator 72 which is fixedly provided on the parison discharging nozzle 43. A tapered portion 73 is provided at the exit of the nozzle 43. Thus, by changing the position of the inner rod 71 with respect to nozzle 43, the thickness of a parison can be easily controlled. This is particularly important if a pipe to be molded is complicated in configuration. Because, the thickness of the parison must be increased at a portion where the diameter is relatively large or there are many ups and downs if the uniform thickness in a molded pipe is desired. It should be noted, however, that the bottom end of the inner rod 71 may be formed in a desired configuration in order to facilitate the thickness control.

In some applications, it is preferred that a tube-formed parison laid within a groove of a lower mold half is as shown in FIG. 9, i.e. a tube-formed parison 82 is thinner at a part 83 in contact with a groove 81a of a lower mold half 81 than at a part 84 exposed to air. As for the method of making the lower part 83 thinner than the upper part 84, as shown in FIG. 9, an inner rod 87 necessary for providing a hollow part 85 of the parison 82 is disposed at a position closer to one side of an opening 88 of a nozzle 86. Such position of the inner rod 87 causes the difference in the width of the parison flowing passage at the opening 88 and thereby the parison of a predetermined unequal thickness is discharged out of the nozzle 86.

The reason for making the thickness of the parison unequal is as follows. The parison at the part 83 in contact with the lower mold half is cooled by the contact and thereby it slightly hardens. Therefore, when air is blown into the hollow part 85 of the parison 82 in order to inflate the parison 82, the slightly hardened part can not extend enough as compared with the upper hot soft part. As the result, if the thickness of the discharged parison is equal throughout the whole part, the lower part of the parison cannot extend enough and becomes thicker than the upper part. That means the thickness of the finished pipe is made unequal. The abovementioned problem can be dissolved by discharging the parison in a manner the lower part 83 of the parison is thinner than the upper part 84. Because, as abovementioned, the lower part of the parison cannot extend enough as compared with the upper part, at the time of inflating the parison, the lower part cannot be made thin so much as the upper part. As a result, the thickness of the finished pipe can be made equal throughout the whole part.

As described above, in accordance with the present invention, a pipe of any required shape can be easily molded at low cost with the use of inexpensive thermal plastic materials. Moreover, since no flash is produced in accordance with the present invention, it is particularly suitable for mass production. The horizontal arrangement of mold halves enables production of a relatively long pipe.

Now, explanation will be had with respect to another aspect of the present invention. That is, when a parison is extended and laid down along a groove engraved on a bottom mold half, it is important that the parison is properly positioned in the groove with an intended thickness. For example, if it is desired to lay a parison in the groove with a uniform thickness, one faces a difficulty at curved portions of the groove. Because, at a curved portion of the groove, the inner curvature line is shorter than the outer curvature line so that the parison tends to become thinner along the outer curvature line while thicker along the inner curvature line. Thus, one tends to lose thickness control at curved portions. Moreover, since the parison has some elasticity, it has a tendency to twist back. In other words, it has a tendency to maintain straightness to some degree. However, at a curved portion, since the parison is forced to bend in registry with the shape of a groove, there is some difficulty in proper positioning of the parison as well as difficulty in thickness control.

In accordance with the present invention, the above-noted difficulties are obviated by providing a nozzle for extruding a parison rotatable with respect to its vertical axis. That is, the nozzle, which is a part of a parison extruder, is rotated at curved portions of a groove in an intended manner. Preferably, the direction of the rotation of the nozzle is in commensurate with the direction of a curved portion. In other words, if the nozzle is moving toward left, then the nozzle is preferably rotated counter-clockwise. The rate of rotation depends upon many factors, such as temperature and viscosity of parison and curvature of a curved portion. Therefore, the rate of rotation must be determined in a particular application as desired. It is to be noted, furthermore, that the rate of rotation need not be constant, and it can be varied as the nozzle follows a curved portion. Meanwhile, the nozzle is usually not rotated as it follows straight portions of a groove.

Figure 10:
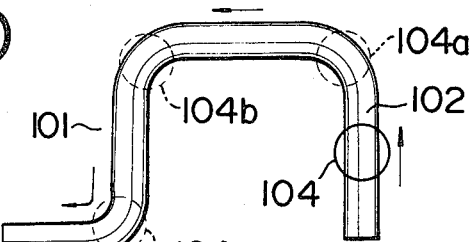
FIG. 10 is a plan view showing the relationship between a nozzle and a groove.

Now, referring to FIG. 10, a nozzle 104 moves along a groove 102 engraved on a bottom mold half 101 in the direction as shown by the arrows. In accordance with the present invention, the nozzle 104 is rotated in an intended direction while it moves along curved portions 104a, 104b and 104c of the groove 102. In a preferred mode, the nozzle 104 is rotated counter-clockwise at 104a and 104b because it changes its direction to left; on the other hand, the nozzle 104 is rotated clockwise at 104c since it changes its direction to right.

Figure 11:
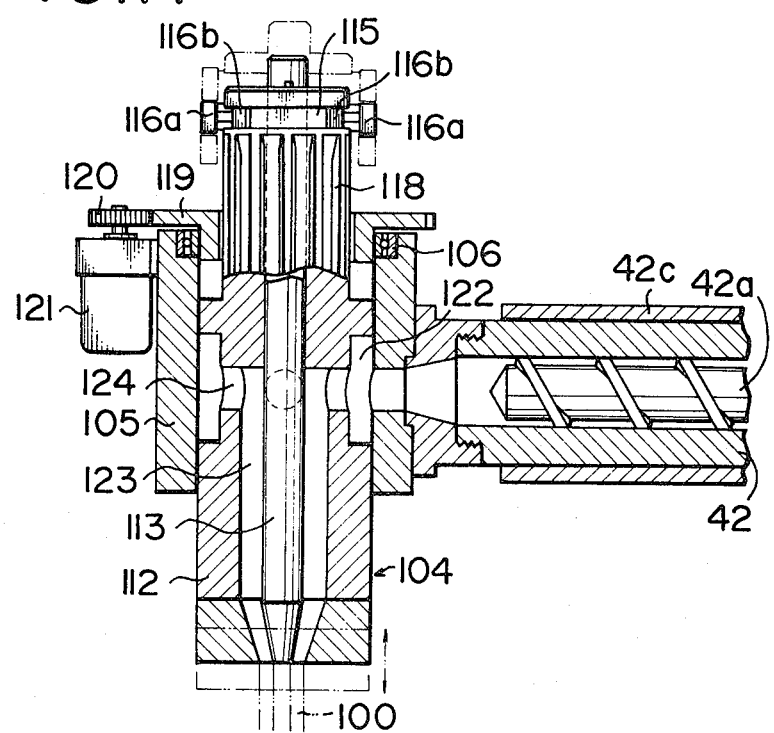
FIG. 11 is a vertical cross-sectional view showing a nozzle which is rotatable and vertically movable.
Figure 12:
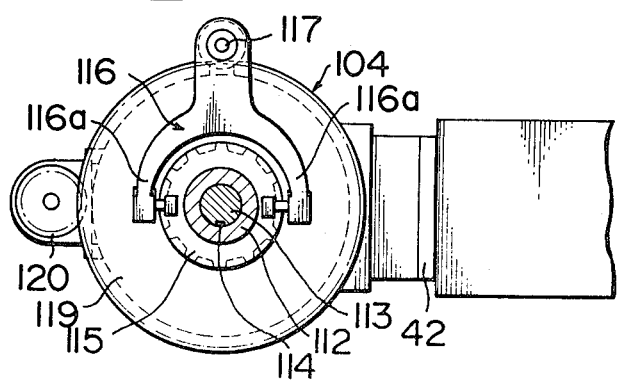
FIG. 12 is a top plan view of the device shown in FIG. 11.

With reference to FIGS. 11 and 12, in which like numerals indicate like elements, there is shown one embodiment of the present invention having a structure which allows to rotate the nozzle 104 in a desired manner. The nozzle 104 is provided at one end of the tube 42 through which parison forming material is transported by the auger screw 42a. The nozzle 104 includes a die 112 and a mandrel 113, both of which are keyed together by a key 114. As shown in FIG. 11, the nozzle 113 is slidably and rotatably fitted in a nozzle holder 105 which is fixedly mounted at one end of the tube 42.

There is also provided an arm 116 which is mounted on the piston rod of a double-acting cylinder actuator 117, which is connected to the central control unit. The arm has a forked portion 116a to which are planted guide members 116b, 116b. These guide members 116b, 116b, are partly inserted in an annular recess 115 provided near the top end of the nozzle 112. Accordingly, by operating the cylinder actuator 117 in accordance with instructions fed by the central control unit, the nozzle 112 can change its vertical position with respect to the bottom mold half 101 by sliding inside the holder 105. There is also provided a gear member 119, which is mounted on top of the holder 105 through a bearing 106. The gear member 119 is provided with a center hole, the inner peripheral surface of which is provided with a plurality of projections which mate with a spline 118 provided on the outer peripheral surface of the nozzle 112. The gear member 119 is provided with gear teeth along its outer peripheral surface, and the gear member 119 is in mesh with a driving gear 120 mounted on the driving shaft of a two-way driving motor 121. The motor 121 is fixedly mounted on the holder 105 and it is driven to rotate in either direction in accordance with the instructions supplied from the control unit. Therefore, it is now obvious that the nozzle 112 can be rotated in either direction by means of the motor 121 through the driving gear 120 and the gear member 119.

As best shown in FIG. 11, the nozzle 112 is provided with an intermediate annular recess 122, a center hole 123, and a plurality of through-holes 124 connecting the intermediate annular recess 122 and the center hole 123. With such a structure, the parison material inside the tube 42 is first fed into the intermediate annular recess 122 by the action of the auger screw 42a. Then, the parison material is delivered into the center hole 123 through the through-holes 124. Finally, the parison material is discharged out of the nozzle 112 in the form of a hollow plastic tube, or parison 100.

It is to be noted that, in the embodiment described above, the nozzle 112 and the mandrel 113 are keyed together. However, it is also possible to provide the mandrel 113 slidingly movable with respect to the nozzle 112. If so provided, the thickness of the parison 100 may be varied with ease.

Explanation will now be had with respect to the operation of the present invention having a structure with a rotatable nozzle as described above. The nozzle 104 is first located immediately above and at one end of the groove 102, i.e., bottom right end of the groove 102 in FIG. 10. The nozzle 104 is first moved upward along the straight portion of the groove 102 with maintaining a predetermined distance between the nozzle 104 and the bottom mold half 101. That is, if the straight portion is an upward slope, then the nozzle 112 must be pulled up as its moves along. When the nozzle 104 comes to the first curved portion 104a, the nozzle 104 begins to rotate, preferably in the counter-clockwise direction since the nozzle 104 is turning left. Then, when the nozzle 104 comes to the second straight portion, the nozzle 104 ceases its rotation. The similar operation will be repeated thereafter except that the nozzle 104 will be rotated clockwise at the curved portion 104C since the nozzle 104 turns right there.

As previously noted, the rate of rotation of the nozzle 104 depends on many factors. As regards the relationship between rate of rotation and turning angle, or radius of curvature, it can be generally said that rate of rotation should be increased as radius of curvature becomes smaller. In this connection, it should be appreciated that FIG. 10 only shows 90 degree curved portions, but the present invention is not limited to this particular angle.

It is now clear that the present invention provides a method and apparatus which enables production of a hose or tube of a thermoplastic resin with any complicated configuration. The present invention also provides a method and apparatus with a structure having a rotatable nozzle, which ensures proper positioning of a parison along a crooked groove and complete control over the wall thickness of a parison.

It will be understood that the various changes in details, materials, steps and arrangements of parts, which have been herein described and illustrated in order to explain the nature of the invention, may be made by those skilled in the art within the principle and scope of the invention as expressed in the appended claims. However, while the invention has been described with reference to the structure disclosed herein, it is not to be confined to the details set forth, and this application is intended to cover such modifications or changes as may come within the scope of the following claims.

What is claimed is:

1. A method for molding a plastic pipe comprising the steps of:
    positioning a parison discharged out of a parison extruder having a nozzle into and along a first groove provided on a top surface of a bottom mold half and having at least one portion curved relative to a longitudinal axis of said first groove;
    maintaining a predetermined distance between said extruder and said first groove during said positioning;
    providing relative movement between said first groove and said nozzle along said longitudinal axis during said positioning;
    rotating said nozzle over a predetermined angle about a nozzle center axis while positioning said parison along said curved portion such that said rotating is in a direction commensurate with a curvature direction of said curved portion;
    placing a top mold half provided with a second groove on said bottom mold half, said first groove being in registry with said second groove to define a mold cavity; and
    injecting pressurized gas into the parison in the mold cavity for shaping as defined by the mold cavity.

2. A method as in claim 1, wherein said nozzle is rotated counterclockwise when said curvature direction is left relative to said positioning along said first groove, and said nozzle is rotated clockwise when said curvature direction is right relative to said positioning along said first groove.

3. A method as in claim 1, wherein a rate of rotation of said nozzle is varied in accordance with a turning angle of said curved portion.

4. In a method for molding a plastic pipe comprising the steps of:
    positioning a parison discharged out of a parison extruder having a nozzle into and along a first groove comprised of straight portions and curved portions relative to a longitudinal axis of said first groove and provided on the top surface of a bottom mold half;
    providing relative movement between said first groove and said nozzle along said longitudinal axis to effect said positioning;
    rotating said nozzle over a predetermined angle in a direction commensurate with curvature directions of said curved portions about a nozzle center axis generally transverse to said longitudinal axis while positioning the parison into and along the curved portions of said first groove;
    placing a top mold half provided with a second groove on said bottom mold half, such that said first groove is in registry with said second groove to define a mold cavity; and
    injecting pressurized gas into the parison in the mold cavity for shaping as defined by the mold cavity.

5. The method of claim 4 wherein said nozzle is not rotated while positioning the parison into and along the straight portions of said first groove.

* * * * *